US011327907B2

(12) United States Patent
Cheng et al.

(10) Patent No.: US 11,327,907 B2
(45) Date of Patent: May 10, 2022

(54) METHODS AND APPARATUS FOR IMPROVING SPI CONTINUOUS READ

(71) Applicant: Macronix International Co., Ltd., Hsinchu (TW)

(72) Inventors: Shunli Cheng, Zhubei (TW); Shih-Chou Juan, Taoyuan (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 16/923,336

(22) Filed: Jul. 8, 2020

(65) Prior Publication Data
US 2022/0012190 A1    Jan. 13, 2022

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01)

(58) Field of Classification Search
CPC .................................................. G06F 21/554
See application file for complete search history.

(56) References Cited

U.S. PATENT DOCUMENTS

| 5,274,784 A * | 12/1993 | Arimilli ............... G06F 13/4217 710/307 |
| 7,082,481 B2 | 7/2006 | Lambrache et al. |
| 7,792,030 B2 * | 9/2010 | Mangano ............ G06F 13/4217 370/230.1 |
| 8,156,274 B2 | 4/2012 | Kapelner |
| 8,417,864 B2 * | 4/2013 | Sun ..................... G06F 13/4256 710/301 |
| 2020/0045216 A1 | 2/2020 | Chang |

FOREIGN PATENT DOCUMENTS

| TW | 200530822 A | 9/2005 |
| TW | 201030525 A | 8/2010 |

* cited by examiner

*Primary Examiner* — Henry Tsai
*Assistant Examiner* — Juanito Borromeo
(74) *Attorney, Agent, or Firm* — Fish & Richardson P.C.

(57) ABSTRACT

Method and apparatus for improving continuous read operations with expanded serial interface are provided. In one aspect, a device comprises: a memory configured to store data; a buffer configured to receive data from outside of the device and transfer the received data to the memory; a plurality of input pins configured to be coupled to an expanded serial peripheral interface (xSPI); and a processor configured to: select a slave device, through the xSPI, from a plurality of slave devices, send instruction data to the slave device for data reading, receive data, through the xSPI, from the selected slave device, and receive a signal on a data strobe line of the xSPI and determine data reading operations based on the received signal.

26 Claims, 7 Drawing Sheets

METHODS AND APPARATUS FOR IMPROVING SPI CONTINUOUS READ

TECHNICAL FIELD

This disclosure relates in general to integrated circuits and their operations.

BACKGROUND

The Expanded Serial Peripheral Interface (xSPI) has been incorporated in modern electrical devices and systems as an interface having high data throughput, low signal count, and some backward compatibility. The xSPI permits access to multiple slave devices that are compliant with the interface. The xSPI is a synchronous serial communication interface specification with which electrical devices can communicate through a shared bus in a full duplex mode using a master—multiple slave architecture with a single master device and one or more slave devices. For data transfer from a slave device to the master device, the xSPI bus includes a data strobe signal line carrying the data strobe signal that is driven by the slave device and is aligned with the data transferred to the master device.

SUMMARY

In general, in some aspects, the subject matter of the present disclosure covers a device, the device comprising: a memory configured to store data; a buffer configured to receive data from outside of the device and transfer the received data to the memory; a plurality of input pins configured to be coupled to an expanded serial peripheral interface (xSPI); and a processor configured to: select a slave device, through the xSPI, from a plurality of slave devices, send instruction data to the slave device for data reading, receive data, through the xSPI, from the selected slave device, and receive a signal on a data strobe line of the xSPI and determine data reading operations based on the received signal.

Implementations of the device may include one or more of the following features. For example, in some implementations, the processor is configured to determine data reading operations based on the received data strobe signal by: when an alternating data strobe signal is received on the data strobe line, storing the received data packets in the buffer and transferring the stored data from the buffer to the memory.

In some implementations, the processor is further configured to determine data reading operations based on the received data strobe signal by: when a data strobe constant signal is received on the data strobe line, pausing the data reading operations. In some implementations, the pausing of the data reading operations comprises: reading, by the processor, a current data storing address on the memory as an intermediate address, and storing the intermediate address.

In some implementations, the processor is further configured to resume data reading operations based on the received data strobe signal being changed from the constant signal to the alternating signal, and the processor is configured to resume the data reading operations by: reading the stored intermediate address, receiving data, through the xSPI, from the selected slave device, and storing the received data in the buffer and transferring the stored data from the buffer to the intermediate address of the memory. In some implementations, the device is configured to provide a clock signal to the slave device through the xSPI, and the device is configured to maintain the clock signal once the data reading operations start.

In some implementations, the data packets are edge aligned with the data strobe signal, and wherein the data received by the buffer is center aligned with the clock signal. In some implementations, the instruction data comprises a command instruction, an address information, and dummy cycles, and the address information comprises at least one of a source address, a destination address, or a start reading address of the slave device.

In general, in another aspect, the subject matter of the present disclosure may encompass a device comprising: a memory configured to store data; a controller comprising: a processor configured to control data reading in the device, a controller buffer connected with the processor and configured to receive data from the memory and to store the data, the controller buffer further configured to output the data on an expanded serial peripheral interface (xSPI), wherein the controller buffer is configured to output data based on a determination that the device is ready for data transmission and the controller buffer being full, a counter connected with the processor and the controller buffer, and configured to monitor data transmission from the controller buffer to the xSPI, wherein the processor determines whether the device is ready for the data transmission based on a monitoring result from the counter.

Implementations of the device may include one or more of the following features. For example, in some implementations, the device is configured to output a signal on a data strobe line indicating status of the device for data reading by: outputting an alternating signal on the data strobe line, based on the controller buffer being full, to the xSPI, and outputting a constant signal on the data strobe line, based on the determining that the device is not ready, to the xSPI. In some implementations, the device is configured to determine whether the device is ready by: determining, based on a portion of the data stored in the controller buffer has been output to the xSPI.

In some implementations, the portion value is in a range from 70% to 75%. In some implementations, the device is configured to determine whether the device is ready by: determining, based on a last data packet of the data stored in the controller buffer is being output to the xSPI. In some implementations, the xSPI provides communication and interconnections between the device and a master device that reads data from the device, and the device is configured to control the data transmission through the xSPI.

In some implementations, the device is configured to receive a clock signal provided by the master device, and to output the alternating signal with the alternating signal being synchronized with the clock signal. In some implementations, the device further comprising: a multiplexer configured to output the data strobe signal to the master device through the xSPI, the multiplexer comprising: a first input pin connected with a clock signal input pin of the device, a second input pin connected with a zero line that carries a one bit zero signal, and a select pin connected with the processor and configured to select, based on the determination of whether the device is ready, signals from one of the first input pin and the second input pin as an output signal, wherein the multiplexer select, based on the determination that the device is not ready and the controller buffer being full, the clock signal from the first input pin as the output data strobe signal, and wherein the multiplexer select, based on the determination that the device is not ready, the zero line signal from the second input pin as the output data strobe signal.

In some implementations, the device is configured to receive instruction information through the xSPI, wherein the instruction information comprises a command instruction, an address information, and dummy cycles information, and the address information comprises at least one of a source address, a destination address, or a start reading address on the memory of the device. In some implementations, based on the determining that the device is not ready, the device is configured to: transmit data from the memory to the controller buffer, or process the data stored in the controller buffer.

In general, in another aspect, the subject matter of the present disclosure may encompass a system, comprising: a master device; a plurality of slave devices; an expanded serial peripheral interface (xSPI) that connects the master device to the plurality of slave devices, the xSPI comprising: a chip select signal line that carries a chip select signal provided by the master device to the plurality of slave devices to indicate a selected slave device from the plurality of slave devices, a plurality of data I/O lines configured to transmit data between the master device and the plurality of slave devices, a clock signal line that carries a clock signal provided by the master device to the plurality of slave devices, wherein the clock signal is maintained by the master device once data reading operations start, and a data strobe signal provided by the selected slave device and sent to the master device through the xSPI, wherein, the master device is configured to receive data transmitted from the selected slave device based on the data strobe signal being alternating, and wherein, the master device is configured to determine that the slave device is not ready for data transmission based on the data strobe signal being constant.

In some implementations, the master device is configured to pause receiving data from the selected slave device in response to determining that the slave device is not ready for data transmission. In some implementations, the selected slave device is configured to transmit data packages that are edge aligned with the data strobe signal, and wherein the data received by the plurality of slave devices is center aligned with the clock signal. In some implementations, the selected slave device includes a multiplexer to output signal on the data strobe line by selecting one of the clock signal and a constant signal. In some implementations, the master device is configured to resume receiving data from the selected one slave device in response to the data strobe signal being changed from constant to alternating. In some implementations, the selected slave device is configured to transfer data from a memory of the slave device to a controller buffer of the slave device or process the data stored in the controller buffer of the slave device while the selected device is not ready.

The techniques can be implemented for memory devices communication. In particular, the techniques can be incorporated in a single master—multiple slave memory device system with the xSPI to improve the inter communication when a selected slave device is busy for data reading. Additionally, the techniques utilize a data strobe signal line driven by the slave device to transfer various signals that correspond to status of the slave device to the master device in the system.

The techniques can be applied to various types of non-volatile memory devices, such as NOR flash memory, NAND flash memory, resistive random-access memory (RRAM), phase-change random-access memory (PCRAM), among others. Additionally or alternatively, the techniques can be applied to various types of devices and systems, such as secure digital (SD) cards, embedded multimedia cards (eMMC), or solid-state drives (SSDs), embedded systems, among others.

The details of one or more embodiments are set forth in the accompanying drawings and the description below. Other aspects, features and advantages will be apparent from the description, the drawings, and the claims.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

Figure 1:
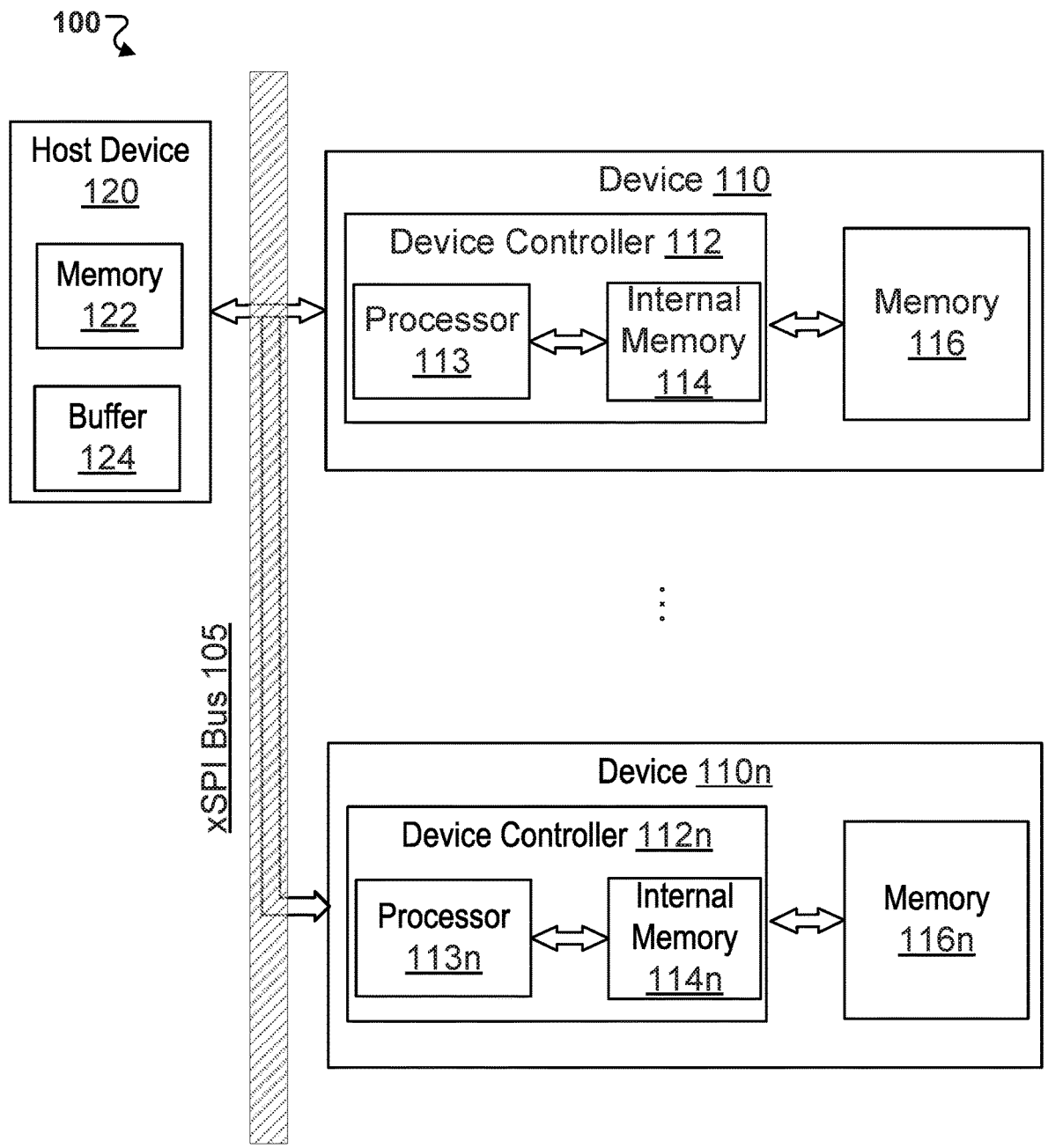
FIG. 1 illustrates an example of a memory device system 100 with the xSPI.

This disclosure relates to the communications and interconnections of memory devices through an interface such as an xSPI. In particular, this disclosure concerns methods and apparatus for improving data reading operations for a master device when a corresponding slave device is busy.

An xSPI bus is a serial synchronous communication bus developed for non-volatile memory device systems that operates in compliance with xSPI standards. It supports a single master—multiple slave bus topology with a synchronous clock signal provided by the master device of the memory device system. It also supports 24 bit and 32 bit addressing, data rate options for SDR and DDR devices, and multiple-wire interfaces between the memory devices including 4-wire, 7-wire, 8-wire, 11-wire, and 12-wire interfaces. In a memory device system with the xSPI bus, once a slave device is selected, instruction data is sent from the master device to the selected slave device through data I/O lines of the xSPI bus. For a data reading operation originated by the master device, the selected slave device controls the data transmission operations by outputting data packets from its controller buffer and synchronizing the output data packets with raising edges or falling edges of a data strobe signal which is also driven by the slave device. Within the slave device, designated data is read from a memory of the slave device and temporarily stored in the controller buffer of the slave device for data reading through the xSPI. With this configuration, the slave device sends out data packets for master device data reading when the controller buffer of the slave device is full, i.e., the size of the designated data exceeds the size of the control buffer and the control buffer is at capacity limit. Alternatively, the slave device sends out a data packet when the size of the designated data is less than the size of the control buffer but all of the designated data has been accumulated in the controller buffer from the memory of the slave device. In this case, however, the xSPI standard does not support continuous data reading operations if the slave device is busy during the data transmission.

The data strobe signal is outputted from the slave device for the continuous data reading operations. When the slave device is ready for data transmission and the controller buffer of the slave device is full or accumulated by designated data, the controller outputs an alternating data strobe signal on the data strobe signal line. The slave device outputs data packets through the xSPI by edge aligning the output data packets with the data strobe signal. With this configuration, the alternating data strobe signal is sent to the master device through the xSPI indicating the slave device is ready for the data reading operations. On the other hand, when the slave device is not ready or the controller buffer of the slave device is not fully accumulated by designated data, the controller can output a consistently low signal on the data strobe signal line. This consistently low signal is sent to the master device, and the master device can interpret the consistently low signal as indicating the slave device is busy.

In accordance to the received data strobe signal, the master device determines corresponding for the data reading. For example, when the received data strobe signal is alternating, the master device interprets that the slave device is performing data transmission. As a result, the master device reads the transmitted data on the xSPI bus and stores the received data in its memory. On the other hand, when the received data strobe signal is constant, e.g., consistently low, the master device interprets that the slave device is busy and not performing data transmission. Consequently, the master device pauses its data reading operations. The master device can stop receiving data through the data I/O lines of the xSPI and temporarily store its data storing address. In some implementations, the master device can perform other activities while the slave device indicates that it is busy. For example, in response to an indication that the slave device is busy, the master device may de-select the slave device and select another slave device for data reading/writing operations through the data I/O lines of the xSPI.

In this disclosure, the slave device determines its status for the data reading operations by monitoring the data transferred through the xSPI bus. For example, the slave device may use an embedded counter to monitor what portion of the total capacity of the controller buffer has been output. The slave device determines it will change from ready to busy for data transmission if the portion value is equal to or higher than a preset number. In another example, the slave device monitors the number of data packets transmitted out of the controller buffer. The slave device determines it will change from ready to busy for data transmission when a last data packet is being transferred through the xSPI.

FIG. 1 illustrates an example of a memory device system 100 that uses the xSPI. The system 100 includes one or more devices 110 to 110n and a host device 120. The host device 120 includes a memory configured to store data. The host device 120 also includes a buffer 124 configured to receive data from outside of the host device and transfer the received data to its memory 122. In additional, the host device 120 includes a plurality of input pins (not shown) configured to be coupled to the xSPI. Each of the devices 110 to 110n can include a device controller 112 and a memory 116. The device controller 112 includes a processor 113 and an internal memory 114. The internal memory 114 can serve as a control buffer for the device controller 112.

In some implementations, the devices 110 to 110n are memory devices. For example, the device 110 can be an embedded multimedia card (eMMC), a secure digital (SD) card, a solid-state drive (SSD), a flash memory card, a dynamic random-access memory (DDR or SDRAM) card, or some other suitable storage. In some implementations, the device 110 is a smart watch, a digital camera or a media player. In some implementations, the device 110 is a slave device that is selected by a master device, for example, the host device 120.

In some implementations, the host device 120 is a master device and the one or more devices 110 to 110n are slave devices. The memory device system 100 has a single master-multiple slave bus topology with an xSPI bus 105 communicating the master device 120 and the one or more slave devices 110 to 110n.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. The internal memory 114 performs as a controller buffer of the device controller 112. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM. In some implementations, the internal memory is a cache memory that is included in the device controller 112, as shown in FIG. 1. The internal memory 114 stores instruction codes, which correspond to the instructions executed by the processor 113, and/or the data that are requested by the processor 113 during runtime.

The device controller 112 transfers the instruction code and/or the data from the memory 116 to the internal memory 114. In some implementations, the memory 116 is a non-volatile memory that is configured for long-term storage of instructions and/or data, e.g., an NAND or NOR flash memory device, or some other suitable non-volatile memory device. In implementations where the memory 116 is an NAND or NOR flash memory, the device 110 is a flash memory device, e.g., a flash memory card, and the device controller 112 is an NAND or NOR flash controller. For example, in some implementations, when the device 110 is an eMMC or an SD card, the memory 116 is an NAND or NOR flash; in some implementations, when the device 110 is a digital camera, the memory 116 is an SD card; and in some implementations, when the device 110 is a media player, the memory 116 is a hard disk.

The xSPI bus 105, as described earlier, is a serial synchronous communication bus developed for communication and interconnections between the host device 120 and devices 110 to 110n. It supports a single master—multiple slave bus topology with synchronous clock signal provided by the host device 120 in the memory device system. The xSPI bus 105 also supports 24 bit and 32 bit addressing, data reading and writing for DDR devices, and multiple wires interfaces.

Figure 2:
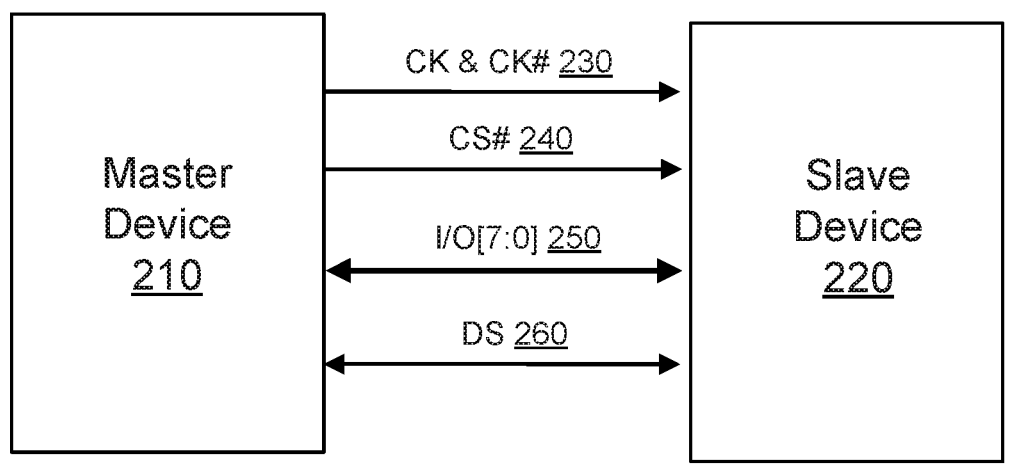
FIG. 2 illustrates an example system 200 that includes one master device and one slave device communicating through the xSPI.

FIG. 2 illustrates an example system 200 that includes one master device and one slave device communicating through the xSPI described in FIG. 1. The system 200 includes a master device 210, a slave device 220, and a 4-wire serial bus therebetween. The master device 210 and the slave device 220 may be provided by the host device 120 and one of the devices 110 to 110n shown in FIG. 1, respectively.

This xSPI of the example system 200 provides a synchronous, full duplex master-slave based communication including a clock signal (CK) on a clock signal line 230, chip select signal (CS) on a chip select line 240, data on data I/O lines 250, and a data strobe signal (DS) on a data strobe line 260. The master device 210 includes multiple pins that are configured to be coupled to the xSPI bus, e.g., pins to connect to the clock signal line 230, the chip select signal line 240, each data line 250 and the data strobe signal line 260. Similarly, the slave device 220 includes multiple pins that are configured to be coupled to the xSPI bus, e.g., pins to connect to the clock signal line 230, the chip select signal line 240, each data line 250 and the data strobe signal line 260.

In this example, the master device 210 generates the clock signal and delivers the clock signal to the slave device 220 through the xSPI bus. The chip select signal is also driven by the master device 210 and is used to select the slave device 200 for operations. In general, the chip select signal is active low and is pulled high to disconnect the slave device 220 from the communication with the master device 210. The data I/O lines 250 are used for data transmission between the master device 210 and the slave device 220, and have a certain word length, e.g., an 8 bit word. The data transmitted between the master device 210 and the slave device 220 is synchronized to the clock signal generated by the master device 210. In this example, the system 200 also includes the bi-directional data strobe line 260 for high speed operations through the xSPI. For example, the data strobe signal may be synchronized with the transmission data and clock signal for data reading or writing operations between the master device 210 and the slave device 220.

To begin a communication through the xSPI, the master device 210 sends the clock signal through the clock signal line 230 and selects the slave device 220 by enabling the chip select signal on the chip select line 240. The chip select signal may be an active low signal, and thus the master device 210 sends logic zero to select the slave device 220. In this example, the xSPI is a full-duplex interface that both the master device 210 and the slave device 220 can send data at a same time via the data I/O lines 250. During each clock cycle, a full-duplex data transmission occurs. For example, the master device 210 sends a bit on the data I/O lines 250 and the slave device 220 reads it, while the slave device 220 sends a bit on the data I/O lines 250 and the master device 210 reads it. This sequence is maintained even when only one-directional data transfer is intended. In this example, the data transmission may continue for any number of clock cycles. When complete, the master device 210 stops alternating the clock signal and typically deselects the slave device 220.

Figure 3:
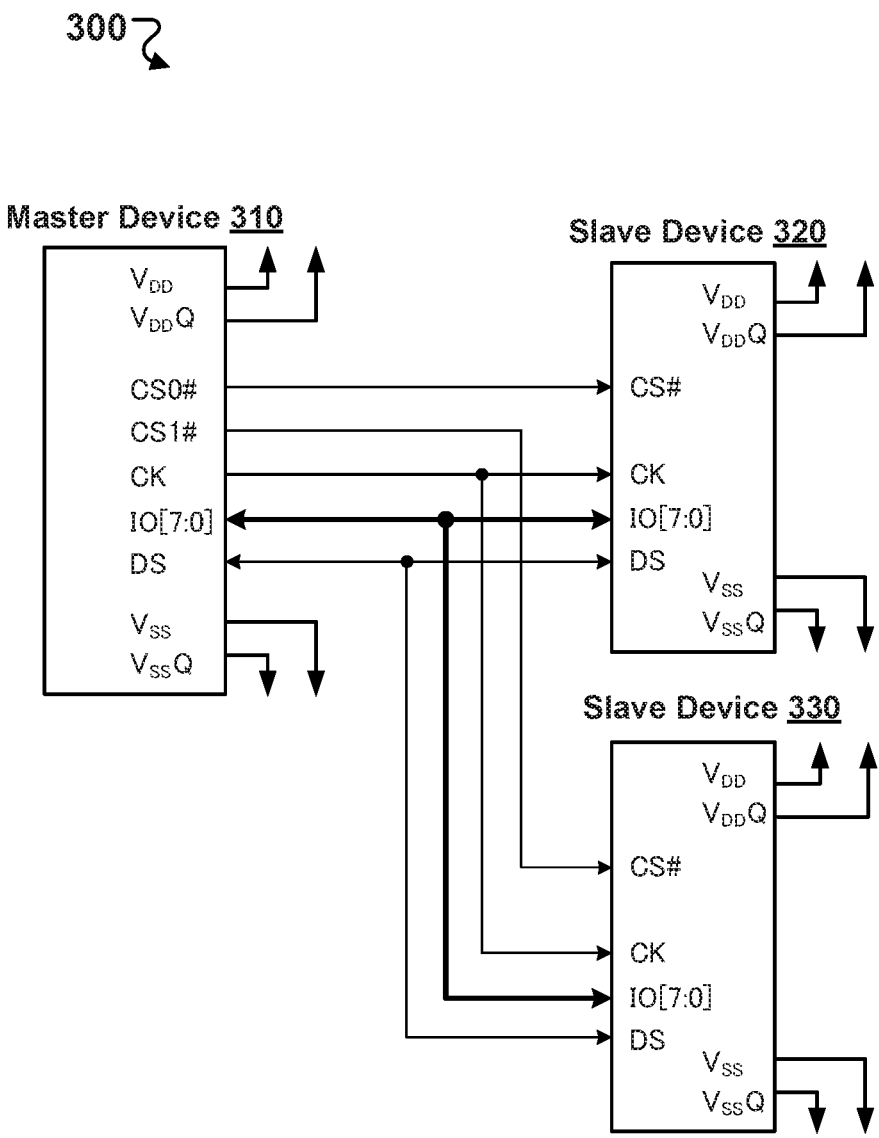
FIG. 3 illustrates an example system 300 that includes a single master device and multiple slave devices communicating through the xSPI.

FIG. 3 illustrates an example system 300 that includes a single master-multiple slave memory devices communicating through the xSPI described in FIG. 1. In this example, the single master device 310 is connected with multiple slave devices 320 and 330 in a regular mode. The master device 310 provides two chip select signals CS0 and CS1 sending to the slave devices 320 and 330, respectively. With this configuration, the master device 310 asserts only one chip select at a time. For example, the master device 310 may only select one of the slave devices 320 and 330 by enabling one of the chip select signals CS0 and CS1. In some implementations, the system 300 may use pull-up resistors between chip select signal lines where the master device's chip select pins are default to an undefined state. When the master device is in communication with one of the multiple slave devices, the pull-up resistors may prevent other uninitialized slave devices from responding.

In system 300, the xSPI includes a clock signal (CK) line that is driven by the master device 310 to each of the slave devices 320 and 330. As shown in FIG. 3, data transmission between the master device 310 and slave devices is conducted through the data I/O lines. Since the data I/O pins of the slave devices 320 and 330 are connected together by the data I/O line, the data lines are required to accommodate tri-state (high, low, or high-impedance) where the high-impedance output must be applied at the slave devices when the slave devices are not selected by the master device 310. The data I/O lines may have a certain bandwidth, e.g., an 8 bit word, for the data transmission.

In system 300, each of the data I/O pins of the slave devices 320 and 330 is only connected with the data I/O pin of the master device 310. Once the chip select signal is enabled by the master device 310, the clock signal and data on the data I/O line is available for the selected slave device. If multiple chip select signals are enabled, the master device 310 can not identify a slave device for data transmission and the data on the data I/O line can be corrupted.

Still referring to FIG. 3, the system 300 uses a data strobe line for high speed operations. In this example, the xSPI implements a bi-directional data strobe signal for both data reading and data writing operations to the slave devices 320 and 330. The data strobe signal may be phase shifted by a latency, e.g., for 90°, from the clock signal. In this example, when reading data from one of the slave devices 320 and 330, the data coming to the master device 310 is edge aligned in accordance to the data strobe signal. Alternatively, for data transmitted from the master device 310 to one of the slave devices 320 and 330, the data is center aligned to the clock signal. For high speed communications through the xSPI of the FIG. 3, each of the master device and slave devices includes a supply voltage output $V_{DD}$ for I/O buffer and a voltage supply output $V_{DDQ}$ for data storage registers. Additionally, each of the master device and slave devices also includes ground reference pins $V_{SS}$ and $V_{SSQ}$ for I/O buffer and data storage registers, respectively.

In some implementations, the system 300 can include more than two slave devices and thus, the number of chip select lines from the master device 310 increases. This will request adding number of inputs and outputs of the master device 310 and limit the number of slave devices that can be used in the system 300. There are different techniques that may be used to increase the number of slave devices in the regular mode described in FIG. 3, for example, incorporating a multiplexer for generating the chip select signal. In some implementations, the system 300 may be set up in a daisy-chained configuration, where the data output of the first slave device 320 is connected to the data input of the second slave device 330. The whole chain of the slave devices may be act as a shift data register to provide a bank of data inputs or outputs through the xSPI.

Figure 4:
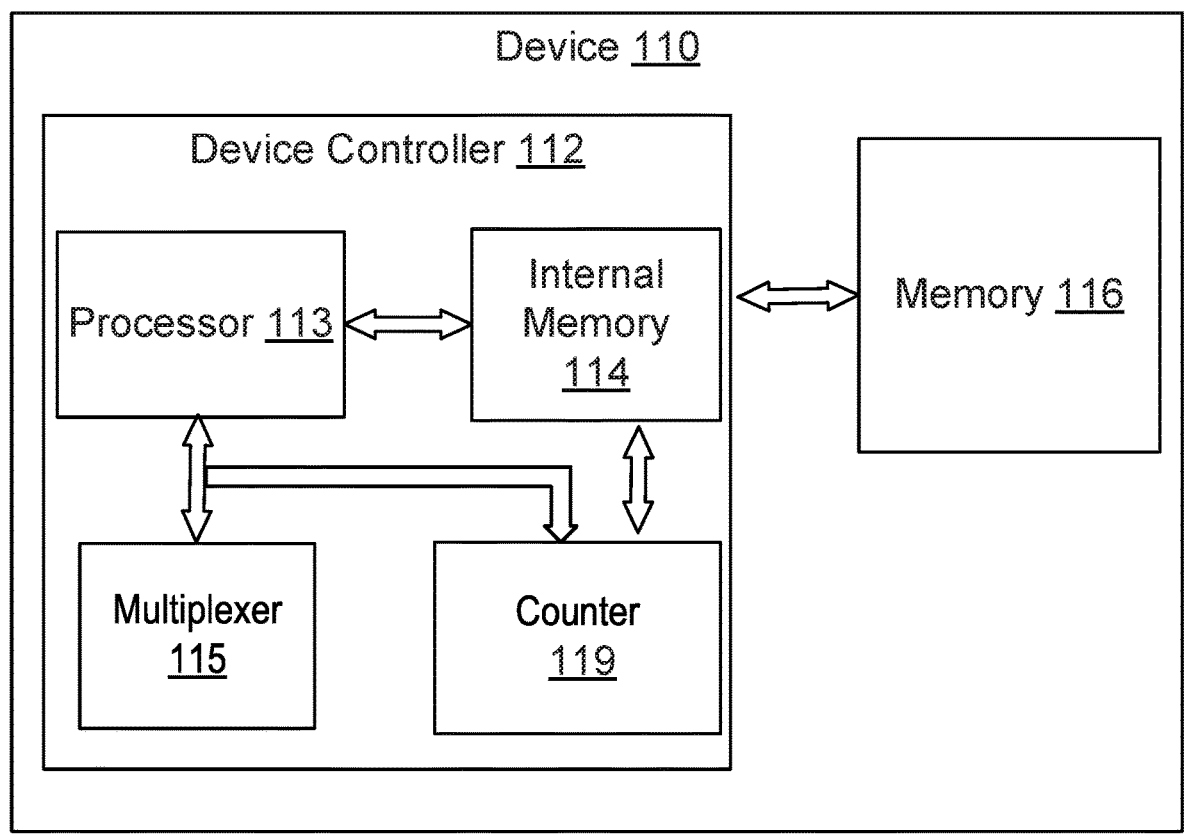
FIG. 4 illustrates an example slave device 110 of the memory device system 100 shown in FIG. 1.

FIG. 4 illustrates an example slave device 110 of the memory system 100 shown in FIG. 1. The example slave device 110, as shown in FIG. 4, includes a multiplexer 115 and a counter 119 both of which can be considered part of the device controller 112 of the slave device 100. The counter 119 may be a register designed to implement counting in the slave device 110. The counter 119 is connected to the processor 113 and the internal memory 114, and the counter 119 is configured to receive counting signal from the processor 113 and to send counting results from the internal memory 114 back to the processor 113. For example, the counter 119 may be incremented or decremented each time when the counter 119 receives the counting signal. The counter 119 may be also configured to monitor the data output and input at the internal memory 114. For data transmission operations between the slave device 110 and the host device 120 as shown in FIG. 1, as each data send instruction gets fetched, the counter 119 increases its stored value by 1. In this example, the slave device 110 includes a memory 116 which stores data and exchanges data with the device controller 112. The memory 116 may be a non-volatile memory.

The multiplexer 115 is connected with the processor 113 to receive operation instructions and data signals. In this example, the multiplexer 115 may be a data selector that selects one signal out of multiple input signals in accordance to one or more select line signals. The select lines are used to choose which of the inputs get produced as output. The select line signals may come from the processor 113. The multiplexer 115 may be used to pass a corresponding signal based on some conditional logics of the slave device 110. For example, based on the data storage status of the internal memory 114, the multiplexer 115 may be configured to select one of the input signals as the output, e.g., a data strobe signal, from the slave device 110 to the host device 120 for data transmission operations. Detailed description regarding the configuration and set up of an example multiplexer 115 is provided later on FIG. 7.

In this example, the internal memory 114 performs as a buffer of the device controller 112 for data transmission operations. For example, for a data writing from the host device 120 to the slave device 110, the device controller 112 receives the transmitted data and store the data temporarily in the internal memory 114. Once the data to be transmitted has been accumulated by the buffer or the buffer is full, the processor 113 perform operations of sending the stored data to the memory 116 of the slave device. For a data reading operation from the slave device 110 to the host device 120, the data transmission is driven by the slave device 110. In this case, the processor 113 firstly executes operations of pulling the transmitted data from the memory 116 to the internal memory 114 of the device controller 112. The data transmission from the slave device 110 to the host device 120 will not start until the internal memory 114 is full. In general, the memory capacity of the internal memory 114 is equal to that of a page of the memory 116. In various example, the memory capacity of the internal memory 114 may be less or larger than that of a page of the memory 116. For a transmitted data that is larger than the size of the internal memory 114, the processor 113 repeats the data pulling from the memory 116 to the internal memory 114 for multiple times until all designated data is sent to the host device 120.

In this example, the data transmission from the slave device 110 to the host device 120 is controlled by the slave device 110, in particular, by the device controller 112 of the slave device 110. After the slave device 110 being selected for data reading by the host device 120, the device controller 112 reads data from the memory 116 and stores data in the buffer of the device controller 112, e.g., the internal memory 114. Due to the configuration of the xSPI, the slave device does not start to output data until its controller buffer, e.g., the internal memory 114 is full. When the data stored in the internal memory 114 has been all outputted, the system 100 pauses the data transmission. In this case, the device controller 112 of the salve device 110 resumes reading data from the memory 116 and storing the data in the internal memory 114. During this period, when the internal memory 114 is accumulated by the data read from the memory 116, the data transmission from slave device 110 to the host device 120 is enabled again. The system 100 and the slave device respectively repeat the data transmission through the xSPI and the data reading from memory 116 to the internal memory 114 until all the designated data is transmitted from the slave device 110 to the host device 120. In this case, the slave device may have a long busy period when the data is being read from the memory 116 to the internal memory 114. This busy period can result in a bottleneck of accessing the memory 116, e.g., a NAND flash memory, which includes a sensing period and page access period causing higher latency of random data access on each page of the NAND flash memory.

Figure 5:
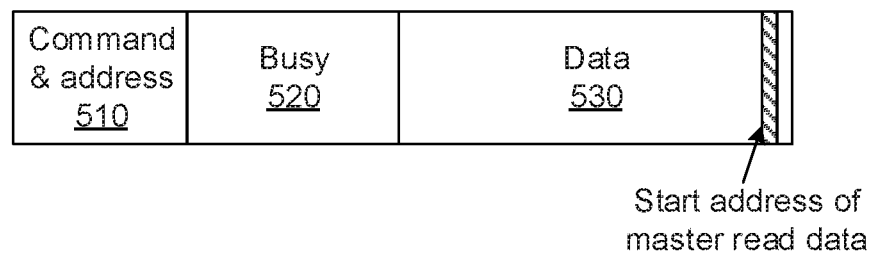
FIG. 5 illustrates an example simplified data structure 500 which can apply when the host device 120 reads data from the slave device 110.

FIG. 5 illustrates a simplified data structure 500 for the data line. Initially, the host device 120 sends out control data 505, including command and address data, to the slave devices through the data I/O line of the xSPI bus. As shown in FIG. 5, the control data 505 includes a command section 510 with address information. The command section 510 may include information for source setup, destination setup, data transfer, or flash programming if the slave device is a flash memory device. The control data 505 can be implemented in only one command & address word or a series of command & address words. In this example, the host device sends out command & address data to the selected slave device. The command & address data may include command cycles (CMD cycles), source address cycles (SRC Addr cycles), and destination address cycles (DEST Addr cycles), which are arranged in sequence. The CMD cycles may include one or more digital values to specify the slave memory device and the host memory device in form of one or more bytes. The SRC Addr cycles may include address information of data to be read from the slave memory device. The DEST Addr cycles may include address information of the data to be written in the host memory device. The address cycles may include multiple bytes, e.g., 3 bytes or 4 bytes, accordingly. The example data structure 500 also includes a busy section 520 or dummy cycles (DMY cycles), which is arranged in sequence after the command section. For data reading operations, the busy section 520 of the data structure 500 is determined by a slave device to allow the selected slave device to be ready for the data transmission. In some implementations, there is no data or signal transmitted on the data I/O bus of the xSPI during the busy/dummy section.

The simplified data structure 500 also includes a data section 530 in which the slave memory reads and transmits the data in packets on the shared data I/O bus of the xSPI for data transmission. Chip select signals are asserted, during this period, by the host device to select the slave device. In this example, the command data can specify a length of the data that equates to the memory capacity of the internal memory 114 to be transferred. The data transmission continues until the chip select signals are dis-asserted by the host device to unselect the slave device or the selective slave device changes its status and not available for the data transmission.

To comply with xSPI data communication requirements, the starting address for data reading is set to be a beginning address of a page of the NAND flash memory of the slave device. The host device 120, as shown in the simplified data structure 500, may send the starting address in the command section 510. The starting address can include a Logical Block Address (LBA) of the memory in the slave device for the data reading operations. Accordingly, the selected slave device converts the received LBA to a Physical Block Address (PBA) of the memory 116 in the selected slave device. The slave device may include a table that is configured to map the LBA to the PBA. As described earlier, the memory 116 may be a NAND flash memory and has a page size of, e.g., 2 KB. In this example, the selected slave device may map LBA (0~0x7FF) and (0x800~0xFFF) to a page 0 and a page 1 of the NAND flash memory 116, respectively. Consequently, the data section 530 includes data from a starting address, e.g., 0 or 0x800, for data reading on a page of the NAND flash memory. In this way, designated data is continuously outputted from the slave device to the host device after the data transmission is started. To comply with xSPI standards, the data to be transmitted between the host device and the slave device is usually shifted out with the most significant bit first. For example, the data transmission starts by shifting a most significant bit stored in the slave device control buffer to the host device. In this regard, the data stored at a last address of the control buffer can be transmitted firstly in the data section 530 to the master device during the data reading. Additionally, as shown in FIG. 5, the data section 530 includes one page data of the NAND flash memory for the data transmission. That is, the data with a data reading end address on the page of the NAND flash memory will be transmitted firstly and the data with a data reading start address on the page of the NAND flash memory will be transmitted lastly in the data section 530 from the control buffer to the host device.

In some implementations, the data section 530 in the data structure 500 includes a data reading starting address that is not a beginning address of a page of the NAND memory, and the designated data is stored on a single page of the NAND memory. In such a case, the slave device memory data reading starts at the data reading starting address on the specific page of NAND memory, and completes by the end of the page. In some implementations, the host device sends multiple command sections 510 including multiple data reading starting addresses to the slave device for data reading operations. For example, when a data reading start address is not a beginning address of a NAND memory page and the designated data is stored continuously on following NAND memory pages, the host device will send multiple data structures 500 including the data reading start address on the specific NAND memory page and starting addresses of the following NAND memory pages, respectively. In this way, in response to the received multiple command sections 510, the selected slave device respectively sends multiple data sections 530 back to the host device through the xSPI, each data section including designated data stored on a page of the NAND memory.

In some implementations, the host device sends a single command section 510 to the slave device for data reading operations when the designated data overflows the controller buffer. That is, the host device sends a designated data reading starting address to the slave device. The selected slave device receives the command and accumulates data from the memory to the controller buffer until the controller buffer is full. During this period, the slave device drives the data strobe signal to present a busy status of the slave device. Once the controller buffer is full, the slave device lifts up the busy status by changing the data strobe signal and starts transmit data to the host device through the xSPI. Alternatively, the control buffer accumulates data from the memory until the stored data reaches a pre-determined threshold. For example, the control buffer configures 256 MB as the threshold of data storage to trigger the data transmission between the host device and the slave device. Once the memory data accumulated in the control buffer reaches to or more than 256 MB, the slave device lifts up the busy status by changing the data strobe signal and starts data transmission. When the controller buffer data transmission is completed, the slave device changes its status back to busy and adjusts the data strobe signal accordingly for data transfer from a next page of the NAND memory to the controller buffer. The slave device repeats above iterations until all the designated data is transmitted from the slave device to the host device.

Figure 6:
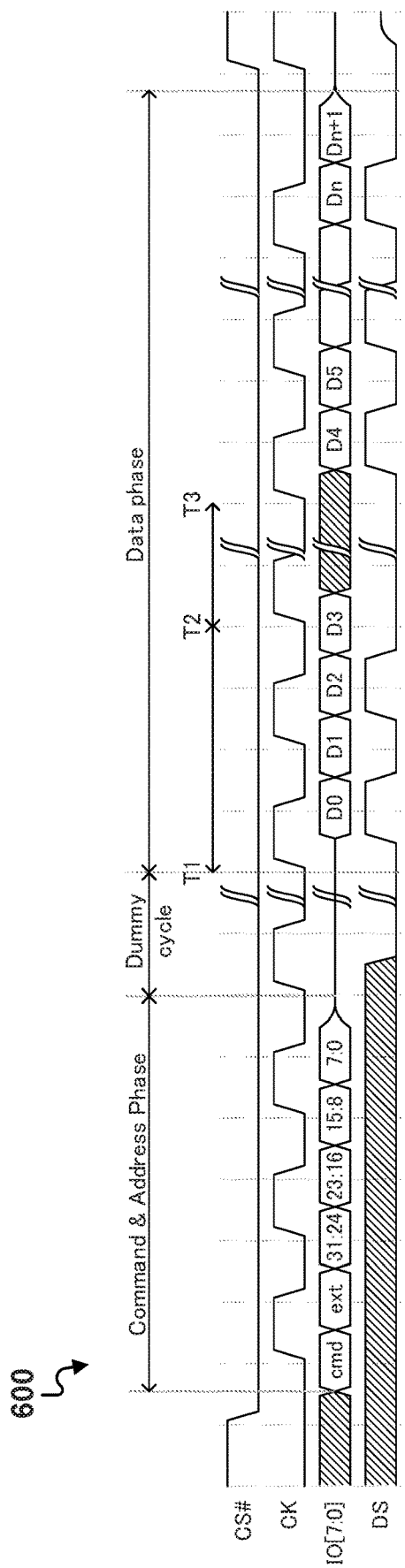
FIG. 6 illustrates a timing diagram 600 which can apply when the host device reads data from the slave device according to an embodiment of the present application.

FIG. 6 illustrates a timing diagram 600 for a host device to read data from a slave device according to an embodiment of the present application. In this embodiment, the host device and the slave device may be the host device 120 and one of the slave devices, e.g., the slave device 110, respectively shown in FIG. 1. The timing diagram 600 shows example waveforms used when reading data from the slave device 110 to the host device 120. As shown in FIG. 6, the timing diagram 600 includes three phases for data reading operations including: 1) a command & address phase; 2) dummy cycle phase; and 3) data phase. These three phases are arranged in series so as to complete the data transmission from the slave device 110 to the host device 120. These three phases also correspond to the described command section 510, busy section 520 and data section 520 in FIG. 5, respectively.

In this example, to select one of the slave devices in system 100, the host device 120 enables a chip select signal by pulling up a resistance level of a corresponding chip select line. Once a slave device is selected, the clock signal driven by the host device 120 starts to be transmitted on the clock line, and is received by the selected slave device. In addition, the host device 120 starts to send instruction data in a form of serial data to the selected slave device through the data I/O lines of the xSPI. In this example, the instruction data, as described earlier in FIG. 5, includes an 8-bit command package, an 8-bit extension package, and a 32-bit address package, which are arranged in series and sent to the slave device during the command & address phase through the example data I/O line. During this period, the data strobe signal driven by the slave device 110 is not enabled, and the data strobe line can be in a high-impendence state. As shown in FIG. 6, when the chip select signal is set low, timing pulses are sequentially output on the clock signal line. An input pin of the slave device 110 starts to receive the 8-bit command instruction, the 8-bit extension instruction, and then the 32-bit address data which is the initial address of the data to be read in the slave device 110.

Once the instruction data transmission is completed, the dummy cycle phase starts for buffering. The dummy cycles, in this example, are determined by the slave device, e.g. the slave device 110, to allow the instruction data to be delivered at the slave device 110 and have the slave device 110 to be ready for the data transfer. In the specific embodiment shown in FIG. 6, the dummy cycles ranging from 1-N clock cycles are provided. During the dummy cycles, the slave device prepares the designated data for data transmission to the host device according to the received instruction data. For example, the slave device 110, once received the data reading instruction from the host device 120, starts to read data from its memory 116 to its internal memory 114 shown in FIG. 4.

In this example, the designated data may be stored on multiple pages of the NAND flash memory 116. The device controller 112 of the slave device 110, with this configuration, reads data from a starting address of a page of the NAND flash memory 116 and stores the data in the internal memory 114 accordingly. In this example, the internal memory 114 is designed to have a same memory capacity as one page of the NAND flash memory 116. The internal memory 114 continuously stores the data read on the page of the NAND flash memory 116 until it is full at a time point T1. The dummy cycle phase ends at the time point T1 indicating that the slave device is ready for data transmission.

The slave device 110 determines a "data is ready" status at T1 and starts to transfer data to the data I/O lines of the xSPI. During the data transmission, the data strobe signal is alternating. The designated data is sent out from the internal memory 114 of the slave device 110 in a series of data packets. The size of each of the data packets may equal to the bandwidth of the data I/O lines, for example, an 8-bit line word. In this example, the output data packets D0-D3 are edge aligned with the data strobe signal for high speed operations through the xSPI.

At a certain point after the data transmission starts, the slave device 110 determines that it is not ready for a continuous data reading and as a result, pauses the data transfer through the xSPI by changing the data strobe signal to consistently low. In this example, the slave device 110 may determine, at a time point T2, that a portion, e.g., 75%, of the data stored in the internal memory 114 of the slave device 110 has been output to the data I/O line of the xSPI. In accordance to this determination and after completing ongoing data transfer from the internal memory, the slave device 110 then changes the signal output on the data strobe line from an alternating data strobe signal to a consistently low signal, and outputs a high-impedance state at its data output pin. In some other examples, the slave device may determine, at the time point T2, that a last data packet is being outputted from the internal memory 114 to the host device 120 through the xSPI. As a consequence, and after completing the last data packet transmission, the slave device 110 then pauses the data transmission by keeping the data strobe signal consistently low.

As shown in FIG. 6, the chip select signal is kept enabled and an alternating clock signal is maintained once the data transmission starts; the chip select signal and clock signal are not affected by the above described operations.

The slave device 110, in this example, may use the counter 119 to monitor the portion of the transferred data remaining in the controller buffer or an ordinal number of the transferred data packets. As described earlier in FIG. 4, the counter 119 may monitor the transmitted data output from the slave device and feedback a monitoring result to the processor 113 in order for the processor to make the determination that the slave is no longer ready (and is thus busy) at the time point T2.

In this example, the slave device 110 delivers a consistently low data strobe signal, e.g., a logic zero, to the host device 120 through the xSPI, in order to provide a notification that the slave device is busy and is not ready for a continuous data transmission. As described earlier, the slave device 110 outputs data that is temporarily stored in its internal memory 114 for the data transmission. The internal memory 114 is controlled by the device controller 112 to read and store designated data from a beginning address of a page of the NAND flash memory 116. In this example, the internal memory 114 is keeping busy to read and store the data until it is full with which the slave device 110 changes its status to ready for data output. At the time point T2, the slave device 110 determines that a new round of data read and store will be start soon to continuously store the designated data from a beginning address of a next page of the memory 116. Correspondingly, the host device 120 pauses receiving data from the slave device 110 once complete ongoing data transmission.

In various examples, the host device 120 may temporarily store a data writing address after pausing receiving the data. For the slave device 110, once its internal memory 114 is full again by designated data read from the memory 116 at a time point T3, it then resumes the data transmission by changing the data strobe signal from consistently low to alternating. In a meantime, the internal memory 114 starts output data packages, e.g., data packets D4-Dn, which are synchronous with the raising edge or falling edge of the data strobe signal. At this point, the host device 120 resumes receiving data from the slave device 120 and reads the temporarily stored data writing address to resume storing the received data in its memory.

As set forth above, the slave device 110 outputs data from its internal memory 114 and transfers data from the memory 116 to its internal memory 114, from T1 to T2 and from T2 to T3, respectively. After the time point T3, the slave device repeats iterations of operations described from T1 to T3 until all the designated data is transferred from the slave device 110 to the host device 120.

Figure 7:
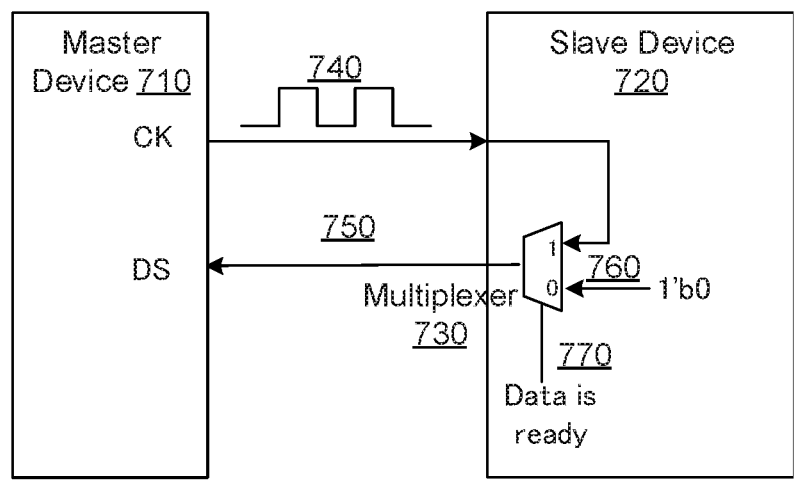
FIG. 7 illustrates an example memory device system 700 that provides a data strobe signal control described in FIG. 6.

FIG. 7 illustrates an example system 700 that provides a data strobe signal control described in FIG. 6. The system 700 is simplified to only include a master device 710 and a slave device 720. In some other examples, the system 700 may include one master device and multiple slave devices to form a one master-multiple slave devices topography. In this example, the slave device 720 is selected by the master device 710 for data transmission. A clock signal is output on the clock signal line 740 by the master device 710 and received by the slave device 720. As shown in FIG. 7, the slave device 720 includes a multiplexer 730 configured to generate and output a data strobe signal on the data strobe line 750 of the xSPI. The multiplexer 730, as previously described in FIG. 4, can be provide by the multiplexer 115 inside in the device controller 112. In this example, the multiplexer 730 includes two input pins connected to the clock signal line 740 and a zero line 760 that carries a one bit zero signal, respectively. The clock signal input pin of the multiplexer 730 can be connected with the clock signal input pin of the slave device 720 and transfer the clock signal to the multiplexer 730 with a latch. The one bit zero input can be provided by a processor or an internal memory of the slave device 720.

In this example, the multiplexer 730 selects one of the input signals based on a select pin 770 which indicates whether the data is ready in the internal memory of the slave device. In system 700 and similarly other systems described earlier in the application, the internal memory performs as a controller buffer of the slave device and is configured to temporarily store the incoming data to or outgoing data from the memory of the slave device. In the example of reading data from the slave device, the internal memory or controller buffer of the slave device is not ready for data transmission until the data to be transmitted has been accumulated by the controller buffer and the controller buffer is full. As shown in FIG. 7, the select pin 770 of the multiplexer is connected with a processor of the slave device, e.g., the processor 113 shown in FIG. 4, and provides select signal indicating whether or not data is ready in the slave device.

When the internal memory of the slave device is full, the select pin 770 of the multiplexer 730 receives a high signal indicating "data is ready" from the processor, e.g., the processor 113. As a result, the multiplexer 730 selects the clock signal input as the data strobe output signal. The data strobe signal, in this case and as shown in FIG. 6, is synchronous with the clock signal with a latch. On the other hand, when the internal memory is not full, the select pin of the multiplexer 730 receives a logic zero signal indicating "data is not ready." In this case, the multiplexer 730 selects the one bit zero input and outputs a consistently logic zero signal as the data strobe signal.

In this system 700, the slave device 720 uses the multiplexer 730 to output the data strobe signal to the master device 710 according to the statuses of the internal memory, e.g. the internal memory 114. In particular, once the internal memory of the slave device changes from a "data is ready" to a "data is not ready" status, for example at time point T2 described in FIG. 6, the data strobe signal is changed from alternating to consistently low. Once the internal memory's status is changed back to "data is ready", the data strobe signal is changed from consistently low back to alternating, as shown at time point T3 describes in FIG. 6.

In FIG. 7, the example multiplexer 730 is illustrated to control the data strobe signal output based on the statuses of the internal memory of the slave device. In various examples, the system 700 may use different circuits or methods to control the data strobe signal generated from the slave device 720.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A device, comprising:
   a memory configured to store data;
   a buffer configured to receive data from outside of the device and transfer the received data to the memory;
   a plurality of input pins configured to be coupled to an expanded serial peripheral interface (xSPI); and
   a processor configured to:
      select a slave device, through the xSPI, from a plurality of slave devices by sending a chip select signal to the slave device,
      send instruction data to the slave device for data reading,
      receive data, through the xSPI, from the selected slave device, and
      receive a data strobe signal on a data strobe line of the xSPI and determine data reading operations based on the received data strobe signal,
      wherein the chip select signal is kept constant during the data reading operations, and
      wherein the data strobe signal is changeable between a first signal and a second signal based on a status of the selected slave device, the first signal indicating that the selected slave device is ready for data transmission and the second signal indicating that the selected slave device is busy and not ready for data transmission.

2. The device of claim 1, wherein the processor is configured to determine data reading operations based on the received data strobe signal by:
   when an alternating data strobe signal is received on the data strobe line, storing the received data in the buffer and transferring the stored data from the buffer to the memory, the first signal comprising the alternating data strobe signal.

3. The device of claim 1, wherein the processor is further configured to determine data reading operations based on the received data strobe signal by:
   when a data strobe constant signal is received on the data strobe line, pausing the data reading operations, the second signal comprising data strobe constant signal.

4. The device of claim 3, wherein the pausing of the data reading operations comprises:
   reading, by the processor, a current data storing address on the memory as an intermediate address, and
   storing the intermediate address.

5. The device of claim 4, wherein the processor is further configured to resume the data reading operations based on the received data strobe signal being changed from the second signal to the first signal, and
   the processor is configured to resume the data reading operations by:
      reading the stored intermediate address,
      receiving data packages, through the xSPI, from the selected slave device, and
      storing the received data packages in the buffer and transferring the stored data packages from the buffer to the intermediate address of the memory.

6. The device of claim 5, wherein the device is configured to provide a clock signal to the slave device through the xSPI, and the device is configured to maintain the clock signal once the data reading operations start.

7. The device of claim 6, wherein the data packages are edge aligned with the data strobe signal, and wherein data received by one of the plurality of slave devices is center aligned with the clock signal.

8. The device of claim 1, wherein the instruction data comprises a command instruction, an address information, and dummy cycles, and
wherein the address information comprises at least one of a source address, a destination address, or a start reading address of the slave device.

9. A device, comprising:
a memory configured to store data; and
a controller comprising:
  a processor configured to control data reading in the device, and
  a controller buffer connected with the processor and configured to receive data from the memory and to store the data, the controller buffer further configured to output the data on an expanded serial peripheral interface (xSPI), wherein the controller buffer is configured to output data based on a determination that the device is ready for data transmission and the controller buffer being full,
wherein the device is configured to receive a chip select signal through the xSPI, the chip select signal being constant to indicate that the device is selected for data reading, and
wherein the device is configured to output a data strobe signal on a data strobe line on the xSPI and to change the data strobe signal between a first signal and a second signal based on a status of the device, the first signal indicating that the device is ready for data transmission and the second signal indicating that the device is busy and not ready for data transmission.

10. The device of claim 9, wherein the device is configured to
output an alternating data strobe signal on the data strobe line, based on the controller buffer being full, to the xSPI, the first signal comprising the alternating data strobe signal, and
output a constant data strobe signal on the data strobe line, based on the determining that the device is not ready, to the xSPI, the second signal comprising the constant data strobe signal.

11. The device of claim 9, wherein the device is configured to determine whether the device is ready by:
determining, based on a portion of the data stored in the controller buffer has been output to the xSPI.

12. The device of claim 11, wherein a value of the portion is in a range from 70% to 75%.

13. The device of claim 9, wherein the device is configured to determine whether the device is ready by:
determining, based on a last data package of the data stored in the controller buffer is being output to the xSPI.

14. The device of claim 10, wherein the xSPI provides communication and interconnections between the device and a master device that reads data from the device, and
wherein the device is configured to control the data transmission through the xSPI.

15. The device of claim 14, wherein the device is configured to receive a clock signal provided by the master device, and to output the first signal to be synchronized with the clock signal.

16. The device of claim 15, wherein the device further comprising:
a multiplexer configured to output the data strobe signal to the master device through the xSPI, the multiplexer comprising:
  a first input pin connected with a clock signal input pin of the device,
  a second input pin connected with a zero line that carries a one bit zero signal, and
  a select pin connected with the processor and configured to select, based on a determination of whether the device is ready, signals from one of the first input pin and the second input pin as an output data strobe signal,
wherein the multiplexer is configured to select, based on the determination that the device is ready and the controller buffer is full, the clock signal from the first input pin as the output data strobe signal, and
wherein the multiplexer is configured to select, based on the determination that the device is not ready, the one bit zero signal from the second input pin as the output data strobe signal.

17. The device of claim 9, wherein the device is configured to receive instruction information through the xSPI, wherein the instruction information comprises a command instruction, an address information, and dummy cycles information, and
wherein the address information comprises at least one of a source address, a destination address, or a start reading address on the memory of the device.

18. The device of claim 9, wherein, based on a determining that the device is not ready, the device is configured to:
transmit data from the memory to the controller buffer, or process the data stored in the controller buffer.

19. A system, comprising:
a master device;
a plurality of slave devices; and
an expanded serial peripheral interface (xSPI) configured to connect the master device to the plurality of slave devices, the xSPI comprising:
  a chip select signal line configured to carry a chip select signal provided by the master device to select a slave device from the plurality of slave devices,
  a plurality of data I/O lines configured to transmit data between the master device and the plurality of slave devices,
  a clock signal line configured to carry a clock signal provided by the master device to the plurality of slave devices, wherein the clock signal is maintained by the master device and the chip select signal is kept constant by the master device to select the slave device once data reading operations start, and
  a data strobe signal line configured to carry a data strobe signal provided by the selected slave device to the master device through the xSPI, the data strobe signal being changeable between a first signal and a second signal based on a status of the selected slave device, the first signal indicating that the selected slave device is ready for data transmission and the second signal indicating that the selected slave device is busy and not ready for data transmission,
wherein the master device is configured to receive data transmitted from the selected slave device based on the data strobe signal being the first signal, and
wherein the master device is configured to determine that the selected slave device is not ready for data transmission based on the data strobe signal being the second signal.

20. The system of claim 19, wherein the master device is configured to pause receiving data from the selected slave device in response to determining that the selected slave device is not ready for data transmission.

21. The system of claim 19, wherein the selected slave device is configured to transmit data packages that are edge aligned with the data strobe signal, and wherein the data received by the plurality of slave devices is center aligned with the clock signal.

22. The system of claim 19, wherein the selected slave device includes a multiplexer to output the data strobe signal on the data strobe line by selecting one of the clock signal and a constant signal.

23. The system of claim 19, wherein the master device is configured to resume receiving data from the selected slave device in response to the data strobe signal being changed from the second signal to the first signal.

24. The system of claim 21, wherein the selected slave device is configured to transfer data from a memory of the selected slave device to a controller buffer of the selected slave device or process the data stored in the controller buffer of the selected slave device while the selected slave device is not ready.

25. The system of claim 19, wherein the first signal comprises an alternating signal and the second signal comprises a constant signal.

26. The device of claim 9, further comprising:
a counter connected with the processor and the controller buffer, and configured to monitor data transmission from the controller buffer to the xSPI, wherein the processor determines whether the device is ready for the data transmission based on a monitoring result from the counter.

* * * * *